United States Patent
Kumbhar et al.

(10) Patent No.: US 10,626,938 B2
(45) Date of Patent: Apr. 21, 2020

(54) ELECTROMECHANICAL BRAKE ACTUATOR, AND SUBASSEMBLY THEREFOR

(71) Applicant: Lucas Automotive GmbH, Koblenz (DE)

(72) Inventors: Sagar Sambhaji Kumbhar, Pune (IN); Andrew Hoodless, Rhens (DE); Joern Borowski, Sankt Augustin (DE); Christoph Muenz, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 15/521,948

(22) PCT Filed: Sep. 17, 2015

(86) PCT No.: PCT/EP2015/071342
§ 371 (c)(1),
(2) Date: Apr. 26, 2017

(87) PCT Pub. No.: WO2016/066325
PCT Pub. Date: May 6, 2016

(65) Prior Publication Data
US 2017/0314628 A1  Nov. 2, 2017

(30) Foreign Application Priority Data
Oct. 27, 2014 (DE) .......... 10 2014 015 848

(51) Int. Cl.
*F16D 65/18* (2006.01)
*F16D 65/16* (2006.01)
(Continued)

(52) U.S. Cl.
CPC .............. *F16D 65/18* (2013.01); *B60T 13/74* (2013.01); *F16D 65/16* (2013.01);
(Continued)

(58) Field of Classification Search
CPC .. F16D 65/18; F16D 2125/50; F16D 2124/24; F16D 2125/40; F16D 2125/48; F16H 37/041; H02K 7/116; B60T 13/74
(Continued)

(56) References Cited

U.S. PATENT DOCUMENTS 6,761,252 B1 *  7/2004  Weiler .................. B60T 13/741
                                                                188/71.8
6,814,190 B1  11/2004  Olschewski et al.
(Continued)

FOREIGN PATENT DOCUMENTS

CN  101528519 A  9/2009
CN  103502677 A  1/2014
(Continued)

OTHER PUBLICATIONS

PCT International Search Report and the Written Opinion, Application No. PCT/EP2015/071342 filed Sep. 17, 2015, dated Feb. 1, 2016.
(Continued)

*Primary Examiner* — Pamela Rodriguez
(74) *Attorney, Agent, or Firm* — MacMillan, Sobanski & Todd, LLC (57) ABSTRACT

A subassembly for an electromechanical brake actuator and electromechanical brake actuator comprising the subassembly, wherein the subassembly comprises a drive device for generating a torque and a gear mechanism for transmitting the torque, the gear mechanism comprising, one behind the other, a first, a second and a third gear stage. The second gear stage is configured as a planetary gear set.

18 Claims, 6 Drawing Sheets

(51) Int. Cl.
*B60T 13/74* (2006.01)
*F16D 121/24* (2012.01)
*F16D 125/40* (2012.01)
*F16D 125/48* (2012.01)
*F16D 125/50* (2012.01)

(52) U.S. Cl.
CPC ...... *F16D 2121/24* (2013.01); *F16D 2125/40* (2013.01); *F16D 2125/48* (2013.01); *F16D 2125/50* (2013.01)

(58) Field of Classification Search
USPC ......... 188/156–158, 162; 475/149, 154, 343, 475/331
See application file for complete search history.

(56) References Cited

U.S. PATENT DOCUMENTS

| | | |
|---|---|---|
| 7,325,658 B2 | 2/2008 | Halasy-Wimmer et al. |
| 8,105,200 B2 | 1/2012 | Dettenberger et al. |
| 8,307,960 B2 | 11/2012 | Seuser et al. |
| 8,790,208 B2 | 7/2014 | Poertzgen et al. |
| 9,145,950 B2 | 9/2015 | Dettenberger et al. |
| 9,340,194 B2 | 5/2016 | Giering |
| 2008/0293534 A1 | 11/2008 | Dettenberger et al. |
| 2009/0247364 A1 | 10/2009 | Sano et al. |
| 2010/0320041 A1 | 12/2010 | Seuser et al. |
| 2014/0041975 A1 | 2/2014 | Takewaki et al. |
| 2016/0377138 A1* | 12/2016 | Loens ................ F16D 65/18 188/106 F |
| 2017/0051801 A1* | 2/2017 | Poertzgen ............ B60T 13/741 |

FOREIGN PATENT DOCUMENTS

| | | |
|---|---|---|
| CN | 203713861 U | 7/2014 |
| DE | 69900686 T2 | 8/2002 |
| DE | 102004048700 A1 | 5/2006 |
| DE | 102005036863 A1 | 2/2007 |
| DE | 102006040129 A1 | 1/2008 |
| DE | 102008030535 A1 | 12/2009 |
| DE | 102009060203 A1 | 6/2011 |
| DE | 102010032053 A1 | 1/2012 |
| DE | 102011102860 A1 | 12/2012 |
| EP | 1767419 A1 | 3/2007 |
| EP | 1611365 B1 | 8/2007 |
| WO | 2006003983 A1 | 1/2006 |
| WO | 2006/094804 A1 | 9/2006 |
| WO | 2006094804 A1 | 9/2006 |
| WO | 2008/046605 A1 | 4/2008 |

OTHER PUBLICATIONS

PCT International Preliminary Report on Patentability, Application No. PCT/EP2015/071342 filed Sep. 17, 2015, dated Oct. 17, 2016.
CN Office Action, Application No. 201580071318.1, dated Jan. 9, 2019.

* cited by examiner

ELECTROMECHANICAL BRAKE ACTUATOR, AND SUBASSEMBLY THEREFOR

CROSS-REFERENCE TO RELATED APPLICATIONS

This application is a national stage of International Application No. PCT/EP 2015/071342, filed 17 Sep. 2015, the disclosures of which are incorporated herein by reference in entirety, and which claimed priority to German Patent Application No. 10 2014 015 848.9 filed 27 Oct. 2014, the disclosures of which are incorporated herein by reference in entirety.

BACKGROUND OF THE INVENTION

The present disclosure relates to the field of motor vehicle brakes. Stated more precisely, the disclosure relates to a subassembly of a brake actuator, for example for an electromechanically operated parking brake or an electromechanically operated service brake.

Electrically operated parking brakes (EPB) more and more frequently replace conventional parking brakes, which convert a force applied by the driver by way of pulleys into a clamping force at wheel brakes of the vehicle. The advantage of electrical parking brakes lies in their ability to be controlled by means of modern on-board electronics. In this way, new application possibilities for the parking brake open up, such as, for example, the implementation of an aid for starting on a hill (hill hold function).

An electrically operated parking brake generally comprises an electromechanical brake actuator, which exerts a clamping force on the wheel brakes by way of a mechanically displaceable brake piston. The brake actuator is essentially defined by a subassembly composed of drive devices and gear mechanisms, which are mounted in a housing in damping manner. To increase the performance capacity, a multi-stage gear mechanism is frequently used in this regard, in order to achieve strong gear reduction of the rotation movement generated by the electric motor.

A particular challenge now consists in designing a high-performance, low-wear and, at the same time, spatially compact electromechanical brake actuator. In particular, the brake actuator must be suitable for installation in the space conditions in the region of a vehicle wheel, which are typically restricted. In this regard, the dimensions of the available installation space can depend on numerous further adjacent vehicle components and can vary greatly, depending in the vehicle variant.

Electromechanical brake actuators having a subassembly are known from the patent applications DE 10 2004 048 700 A1 and DE 10 2010 032 053 A1, which actuators have a three-stage gear mechanism. The gear mechanism comprises two consecutive gear wheel gear stages, in each instance, followed on the output side by a planetary gear set stage.

It has been shown that such brake actuators are not suitable for all installation situations and prevailing space conditions.

BRIEF SUMMARY OF THE INVENTION

An electromechanical brake actuator and a subassembly for it are indicated, which can satisfy even restricted or otherwise special installation situations.

According to a first aspect, a subassembly for an electromechanical brake actuator is provided, which actuator comprises a drive device for generating a torque and a gear mechanism for transmitting the torque. The gear mechanism has a first, a second, and a third gear stage, one behind the other, wherein the second gear stage comprises a planetary gear set.

The planetary gear set of the second gear stage can be disposed to overlap the drive device at least in certain regions. It can be configured in one stage. However, two-stage or multi-stage variants are also possible.

The first and/or the third gear stage can each be configured as a gear wheel gear mechanism(s). In this regard, the first and/or the third gear stage can be configured as a belt gear mechanism. In this case, transmission of torque can take place by means of a toothed belt that is tensed between a drive-side toothed belt wheel and an output-side belt wheel. Alternatively to this, the gear wheels of the first and of the third gear stage, in each instance, can mesh with one another. Likewise, it can be provided that the first and/or the third gear stage are/is configured as a spur-gear gear mechanism(s). In the case of the first gear stage, a drive wheel can be mounted directly on a drive shaft of the drive device.

The first gear stage can comprise an output-side gear wheel, which is coupled in torque-proof manner with a sun wheel of the planetary gear set. The sun wheel can be disposed concentric to the output-side gear wheel of the first gear stage. The sun wheel and the output-side gear wheel can be connected with one another using a shape-fit connection and/or a material-fit connection. Likewise, the formation of a force-fit connection can be provided, for example by setting the sun wheel into the output-side gear wheel by means of a press fit. Also, the sun wheel can be configured in one piece with the output-side gear wheel of the first gear stage.

The first gear stage can comprise an output-side gear wheel that spans a cylindrical space in which the planetary gear set is accommodated, at least in part. For example, it can be provided that the output-side gear wheel is configured with a pot-shaped or C-shaped cross-sectional profile, viewed in a section that contains the axis of rotation of the output-side gear wheel. In this regard, the opposite shanks of the cross-sectional profile can extend essentially in the direction of the axis of rotation and can be connected, in the region of at least one of their ends, by means of a base surface that runs orthogonal to the axis of rotation. The output-side gear wheel of the first gear stage can be configured as a ring gear with teeth on the outside, for example.

When placing the planetary gear set in the cylindrical space of the output-side gear wheel of the first gear stage, the ring gear, in particular, and/or the planet wheels of the planetary gear set can be accommodated in it, entirely or in part. In other words, in this further development it can be provided that the output-side gear wheel of the first gear stage and the planetary gear set overlap at least in part, particularly viewed in the direction of the axis of rotation of the output-side gear wheel. The output-side gear wheel of the first gear stage and the planetary gear set can thereby be disposed so as to be pushed into one another, at least in part.

The planetary gear set can comprise a gear set axle on which an output-side gear wheel of the first gear stage and/or an output-side gear wheel of the third gear stage is/are mounted. Mounting of the aforementioned gear wheels on the gear set axle can take place in torque-proof or rotatable manner. The same holds true for the components of the planetary gear set, wherein in particular, the sun wheel and/or a planet wheel support can be mounted on the gear set axle in rotatable or torque-proof manner. The gear set axle can be configured as a separate component. Alternatively to this, the gear set axle can be configured in one piece with the sun wheel, the planet wheel support, one of the aforementioned gear wheels, a housing component of the subassembly or further components.

When mounting the planetary wheel support on the gear set axle of the planetary gear set, it can particularly be provided that the planetary wheel support accommodates the gear set axle centered on a side on which bearing elements for accommodating planet wheels of the planetary gear set are configured. By means of direct accommodation of the gear set axle on the planet wheel support, the sun wheel and the output-side gear wheel of the first gear stage that is connected with it in torque-proof manner, on the one hand, and the planet wheels, on the other hand, can lie on the planet wheel support. In this manner, the planet wheels and the sun wheel can be mounted on the planet wheel support jointly and in a fixed spatial relationship with one another.

The gear set axle can extend between two opposite housing regions of the subassembly and can be mounted in the housing, for example in a housing recess, with at least one free end. The housing regions can be made available by a housing of the subassembly that surrounds the gear mechanisms and drive devices at least in part. The housing regions can be defined by means of multiple housing parts.

A drive shaft of the drive device can also be mounted in the housing of the subassembly. This can be done by means of mounting a free end of the drive shaft in a recess of the housing, for example.

The planetary gear set can be configured with a fixed ring wheel. A planet wheel support of the planetary gear set can be coupled with the planet wheels in a manner so as to transmit torque and coupled with a drive-side gear wheel of the third gear stage in torque-proof manner. The planet wheel support can comprise bearing elements for the planet wheels, for example bearing journals on which the planet wheels are disposed so as to be rotatable. The planet wheel support can be configured in disk shape. To make a torque-proof coupling available, the drive-side gear wheel of the third gear stage can be disposed on a back side of the planet wheel support that faces away from the planet wheels. In particular, the planet wheel support and the drive-side gear wheel of the third gear stage can be configured in one piece.

Furthermore, an output-side gear wheel of the third gear stage can be configured for coupling with a drive element of a vehicle brake. The output-side gear wheel and the drive element can be coupled with one another concentric to an axis of rotation of the output-side gear wheel. The drive element, in known manner, can be an integral part of a rotation translation converter that follows the subassembly, for conversion of the rotation movement generated by the brake actuator into a linear movement. The rotation translation converter can particularly be configured as a nut/spindle gear mechanism and can convert the torque made available by the gear mechanism unit on the output side into a longitudinal movement for activating a piston of the vehicle brake. In this regard, the drive element can be configured as a spindle component or coupled with such a component.

The output-side gear wheel of the third gear stage can be configured with an accommodation region for accommodating a coupling section of the drive element. The accommodation region can particularly be configured with an inner profiling. Thus, the accommodation region can comprise a preferably cylindrical recess, for example a bore, in which a projection-like or journal-shaped coupling section of the drive element can be accommodated with shape fit with reference to the inner profiling. The inner profiling can be configured, for example, as a hex socket profiling, a torx profiling or a multi-tooth profiling.

Alternatively to this, the output-side gear wheel of the third gear stage can be configured with a coupling section for being accommodated in an accommodation region of the drive element. The coupling section can particularly be configured with an outer profiling. The coupling section of the output-side gear wheel can be configured as a projection-like or journal-shaped projection. The accommodation region of the drive element can comprise a preferably cylindrical recess, particularly a bore, in which the coupling section can be accommodated with shape fit with reference to the outer profiling. The outer profiling can be configured as an external hex profiling, a torx profiling or a multi-tooth profiling.

The subassembly can furthermore comprise a support element for mounting components of the gear mechanism and/or of the drive device. In this regard, a gear wheel of the first and/or third gear stage, in particular, for example the output-side gear wheel of the third gear stage or the drive-side gear wheel of the first gear stage, can be mounted in the support element so as to be rotatable. The support element can be configured as an essentially planar component. It can extend within the subassembly in such a manner that it intersects all the axes of rotation of the gear mechanism. Rotatable mounting of the gear wheel of the first and/or the third gear stage in the support element can take place by means of accommodation of a projection-like mounting section of the gear wheel in a corresponding recess in the support element (or vice versa).

In general, the support element can be configured for arranging components of the gear mechanism and/or of the drive device spatially relative to one another. Furthermore, the support element can be configured to combine multiple components or all the components of the gear mechanism and/or of the drive device into a subassembly that can be handled independently. In particular, all the components of the subassembly can be arranged on the support element spatially relative to one another and attached to it (for example for their joint installation in the housing). In an implementation of this aspect, no gear mechanism components of at least the first and second gear stage lie on a housing of the subassembly, thereby improving the installation, stability, and degree of efficiency of the subassembly. An exception in this context can be the gear set axle of the planetary gear set, which can be mounted in the housing.

The support element can be configured in such a manner that it bears the output-side gear wheel of the third gear stage for rotation about its axis of rotation, for example completely. Thus, the axis of rotation of the output-side gear wheel of the third gear stage (and thereby the output-side axis of rotation of the gear mechanism) can be established by the support element (for example in two opposite regions of the support element). This can take place, for example, by way of bearing recesses or contact regions for the output-side gear wheel formed in the support element. Other or further axes of rotation (for example of the first and/or second gear stage) can be established by the support element.

The ring wheel of the planetary gear set can be configured in one piece with the support element. Integration of one or more gear mechanism elements on the support element generally leads to a reduction in the number of gear mechanism components to be mounted, thereby simplifying installation.

The support element can be configured in multiple parts, for example by combining at least two component parts. The component parts can interact in such a manner that they define a common accommodation space that is surrounded by them, in whole or in part. The gear mechanism can be disposed in this accommodation space, at least in part. In particular, the second and/or the third gear stage can be disposed in the accommodation space, at least in part.

In an implementation of this aspect, an upper component part of the support element can be configured in one piece with the ring wheel of the planetary gear set. In addition or alternatively to this, the upper component part can bear the output-side gear wheel of the third gear stage (and/or parts of at least one further gear stage) on one side. A lower component part of the support element can interact with the upper component part in such a manner that the third gear stage and/or the planetary gear set is/are accommodated in the accommodation space defined by the component parts, at least in part. The lower component part can bear the gear set axle of the planetary gear set and/or the output-side gear wheel of the third gear stage (and/or parts of at least one further gear stage) on one side. Thus, the output-side gear wheel of the third gear stage can be disposed between the upper and lower component parts, at least in certain sections, and mounted therein for rotation about its axis of rotation. The output-side axis of rotation of the gear mechanism can accordingly be formed and established by the component parts of the support element.

Furthermore, an electromechanical brake actuator is indicated, which comprises the subassembly described here. The brake actuator can comprise further components, such as, for example, the rotation translation converter already described above and/or a hydraulic assembly of the vehicle brake. In general, the brake actuator can be part of an electromechanically driven parking brake or of an electromechanically driven service brake.

Other advantages of this invention will become apparent to those skilled in the art from the following detailed description of the preferred embodiments, when read in light of the accompanying drawings.

DETAILED DESCRIPTION OF THE INVENTION

In the following, exemplary embodiments of a subassembly of an electromechanical brake actuator for an electrically operated parting brake are explained. It is understood that the subassembly being presented is also suitable for an electromechanically operated service brake.

Corresponding elements in the figures are provided with the same reference symbols. Terms such as "top" and "underside" or "at the top" and "on the underside" or "horizontal" or "vertical" relate to the orientation of the assembly shown in the figures. It is understood that the subassembly is generally installed horizontally within an electrical parking brake (in other words rotated by 90° as compared with the representation in the figures).

Figure 1:
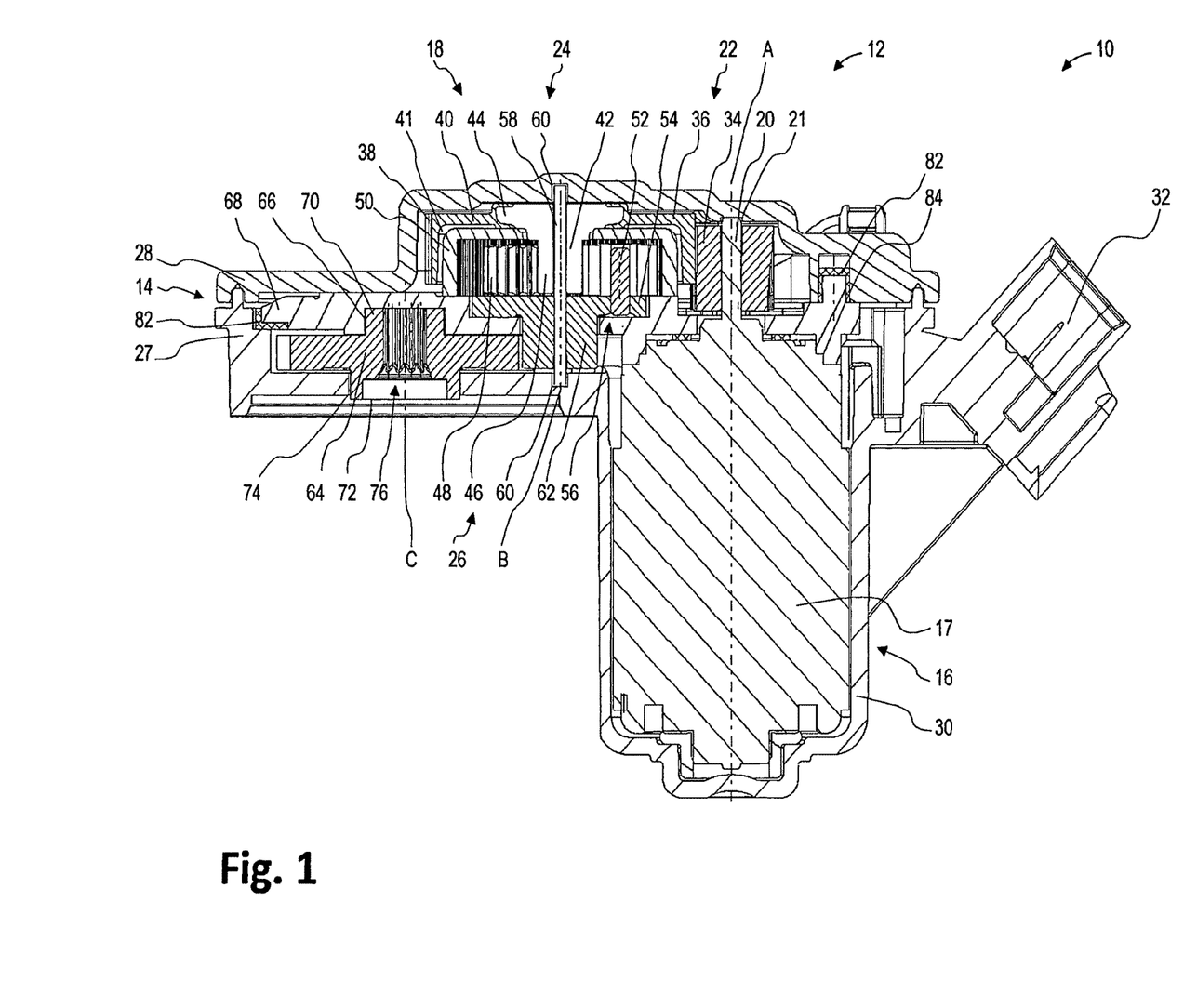
FIG. 1 is a sectional view of an electrical brake actuator comprising a subassembly according to a first exemplary embodiment.

FIG. 1 shows a sectional view of an electromechanical brake actuator 10 according to a first exemplary embodiment. The electromechanical brake actuator 10 comprises a subassembly 12 that has a drive device 16 having an electric motor 17. Furthermore, the subassembly 12 comprises a gear mechanism 18 that is coupled with a drive shaft 20 of the drive device 16, which shaft is driven by the electric motor 17. As will be explained in detail below, the gear mechanism 18 comprises three gear stages 22, 24, and 26, wherein the first and third gear stage 22, 26 are configured as spur-gear gear mechanisms and the second gear stage 24, which lies between them, is configured as a single-stage planetary gear set.

The drive device 16 and the gear mechanism 18 are accommodated in a housing 14 of the subassembly 12. The housing 14 is configured in two parts, with a lower housing part 27 and an upper housing part 28. The lower housing part 27 is particularly configured for accommodating the drive device 16 and is therefore adapted to the dimensions of the device with regard to its spatial design. Thus, the lower housing part 27 has a cylindrical cavity 30 in which the electric motor 17 of the drive device 16 is accommodated. Furthermore, an electrical plug connector 32 having contact pins is formed on at the top of the cylindrical cavity 30, in order to supply electricity to the drive device 16 and to control it. The upper housing part 28 is configured in lid shape and set onto the lower housing part 27 and welded to it. The housing 14 primarily fulfills a protective and sealing function. As will be explained below, it also fulfills a bearing function with regard to individual components of the subassembly 12.

In the following, the gear mechanism 18 will be described in greater detail. As indicated above, the gear mechanism 18 comprises a first gear stage 22, which is disposed on the drive side and coupled with the drive shaft 20 of the drive device 16. The first gear stage 22 comprises two spur-gear gear wheels 34, 36, which engage with one another by meshing with one another. The drive-side gear wheel 34 is connected with the drive shaft 20 of the drive device 16 with a torque-fit connection. For this purpose, the drive-side gear wheel 34 accommodates the drive shaft 20 in a central bore. It can be seen in FIG. 1 that the drive shaft 22 and the drive-side gear wheel 34 rotate concentrically about a common first axis of rotation A of the gear mechanism 18. The drive shaft 20 is furthermore mounted in a recess 21 in the upper housing part 28 at its top end, facing away from the drive device 16.

The output-side gear wheel 36 of the first gear stage 22 is configured with a greater diameter and with a greater number of teeth than the drive-side gear wheel 34. Therefore the first gear stage 22 makes a first gear reduction available. It can be seen in FIG. 1 that the output-side gear wheel 36 is configured as a hollow body having a pot-shaped cross-sectional profile, wherein the spur-gear teeth are configured on an outside of the opposite shanks of this cross-sectional profile. In other words, the output-side gear wheel 36 of the first gear stage 22 comprises a region 38 in the form of a ring gear with outside gear teeth, which region stands in engagement with the drive-side gear wheel 34. The region 38 in the form of a ring gear makes a transition into a base surface section 40 in the form of a circular ring at its top end, in other words close to the upper housing part 28. Thereby the output-side gear wheel 36 of the first gear stage 22 spans a cylindrical space 41 that is essentially closed on one side.

In the case of drive by means of the drive-side gear wheel 34, the output-side gear wheel 36 of the first gear stage 22 rotates about a second axis of rotation B of the gear mechanism 18. The axis of rotation B runs parallel to the first axis of rotation A of the drive-side gear wheel 34 and of the drive shaft 20. In this regard, it can be seen in FIG. 1 that the region 38, in the form of a ring gear, of the output-side gear wheel 36 extends parallel to the second axis of rotation B, while the base surface section 40 of this gear wheel 36 runs orthogonal to this.

The output-side gear wheel 36 of the first gear stage 22 transmits its rotational movement and thereby its torque to a drive-side gear wheel 42 of the second gear stage 24. The second gear stage 24 is configured as a single-stage planetary gear set, wherein the drive-side gear wheel 42 is formed by a sun wheel 42 of the planetary gear set. The sun wheel 42 is accommodated in an opening in the base surface section 40 of the drive-side gear wheel 36 of the first gear stage 22, concentric to the second axis of rotation. For this purpose, the sun wheel 42 has a coupling section 44 that is coupled with the base surface section 40 of the drive-side gear wheel 36 in torque-proof manner.

Proceeding from the coupling section 44, a cylindrical gear-teeth section 46 of the sun wheel 42 extends along the axis of rotation B. The gear-teeth section 46 comprises a region with outer teeth, which stands in engagement with multiple planet wheels 48 of the planetary gear set and drives them. The planet wheels 48 run around the sun wheel 42 in generally known manner, in a fixed ring gear 50 with inner gear teeth, which is configured analogous to the output-side gear wheel 36 of the first gear stage 22, with a pot-shaped cross-section.

The planet wheels 48 are disposed on bearing journals 52 of a planet wheel support 56 of the planetary gear set, so as to be rotatable, and can thereby transmit a torque to the planet wheel support 56. For this purpose, the bearing journals 52 are accommodated in bores in a disk-shaped base surface section 54 of the planet wheel support 56, in torque-proof manner. In total, the planetary gear set of the second gear stage 24 forms a second gear reduction stage of the gear mechanism 18, in known manner.

It can be seen in FIG. 1 that the gear-teeth section 46 of the sun wheel 42, the ring gear 50, as well as the planet wheels 48 are accommodated, at least in part, in the free cylindrical space 41 of the output-side gear wheel 36 of the first gear stage 22. In other words, the planetary gear set is disposed to overlap with the output-side gear wheel 36, viewed along the second axis of rotation B, and partly pushed into it. This arrangement reduces the axial length of this assembly along the axis of rotation B.

Furthermore, it can be seen that the planetary gear set comprises an elongated, cylindrical gear set axle 58 that runs concentric to the second axis of rotation B. The gear set axle 58 is mounted in accommodation recesses 60 in opposite regions of the housing 14, in each instance. To state it more precisely, the gear set axle 58 spans an interstice between the upper housing part 28 and the lower housing part 27 and is mounted in the respective housing part 27, 28 with its free ends. In the case shown, the sun wheel 42 and the output-side gear wheel 36 of the first gear stage 22 coupled with it, as well as the planet wheel support 56 are rotatably mounted on the gear set axle 58, whereas the gear set axle 58 is mounted in the accommodation recesses 60 in the housing 14 in a torque-proof manner.

The second gear stage 24 transmits its rotational movement and thereby its torque to a drive-side gear wheel 62 of the third gear stage 26. The drive-side gear wheel 62 is configured in one piece with the planet wheel support 56 of the planetary gear set of the second gear stage 24 in the case shown. To state it more precisely, it is disposed on the back side of the base surface section 54 of the planet wheel support 56, which side faces away from the planet wheels 48, and extends, proceeding from there, as a cylindrical, spur-geared projection along the second axis of rotation B. Furthermore, the drive-side gear wheel 62 of the third gear stage 26 is mounted on the gear set axle 58 jointly with the planet wheel support 56 and also rotates about the second axis of rotation B.

The drive-side gear wheel 62 stands in engagement with an output-side gear wheel 64 of the third gear stage 26. The output-side gear wheel 64 rotates about a third axis of rotation C, which once again runs parallel to the axes of rotation A, B and forms the output-side axis of rotation of the gear mechanism 18. The output-side gear wheel 64 is mounted in a bearing recess 66 of a support element 68, which will be explained in detail below. For this purpose, the output-side gear wheel 64 has a cylindrical bearing section 70 on its side facing the upper housing part 28, disposed concentrically to the axis of rotation C. On its opposite side, facing the lower housing part 27, the output-side gear wheel 64 has a coupling projection 72, also disposed concentric to the axis of rotation C, which projection extends through an opening 74 in the lower housing part 27 toward the outside. The coupling projection 72 has an accommodation region 76 in the form of a stepped bore configured concentric to the axis of rotation C. The accommodation region 76 comprises an inner profiling in the form of a torx profiling.

The support element 68 is configured with an accommodation recess 66 shaped to correspond to the mounting section 70 of the output-side gear wheel 64 of the third gear stage 26, in order to mount this gear wheel. As is evident from FIG. 1, the support element 68 also lies against further sections of the output-side gear wheel 64 of the third gear stage 26, and also against the ring gear 50 and the planet wheel support 56 of the second gear stage 24. Furthermore, the support element 68 stands in engagement with the drive device 16 by way of an engagement stage formation 84. In this regard, the support element 68 is configured as a planar component that extends essentially horizontally and intersects all the axes of rotation A, B, C of the gear mechanism 18. Furthermore, the support element 68 is mounted in the housing parts 27, 28 by way of damping elements 82. The support element 68 particularly exerts a bearing effect and also a relative positioning effect on the components mentioned above, which stand in contact with the support element 68.

The output-side gear wheel 64 of the third gear stage 26 forms the output gear wheel of the gear mechanism 18 and can be coupled with a drive element 90 of a vehicle brake. This is shown accordingly in FIG. 2, in which the electromechanical brake actuator 10 according to FIG. 1 and a drive element 90 coupled with it or a vehicle brake not shown in any further detail are shown. It can be seen that the drive element 90 comprises a coupling section 92 that is accommodated in the inner-profiled accommodation region 76 of the output-side gear wheel 64 of the third gear stage 26. For this purpose, the coupling section 92 has an outer profiling, not shown in any detail in FIG. 2, which is configured corresponding to the torx profiling of the accommodation region 76 and stands in torque-fit engagement with it.

Figure 2:
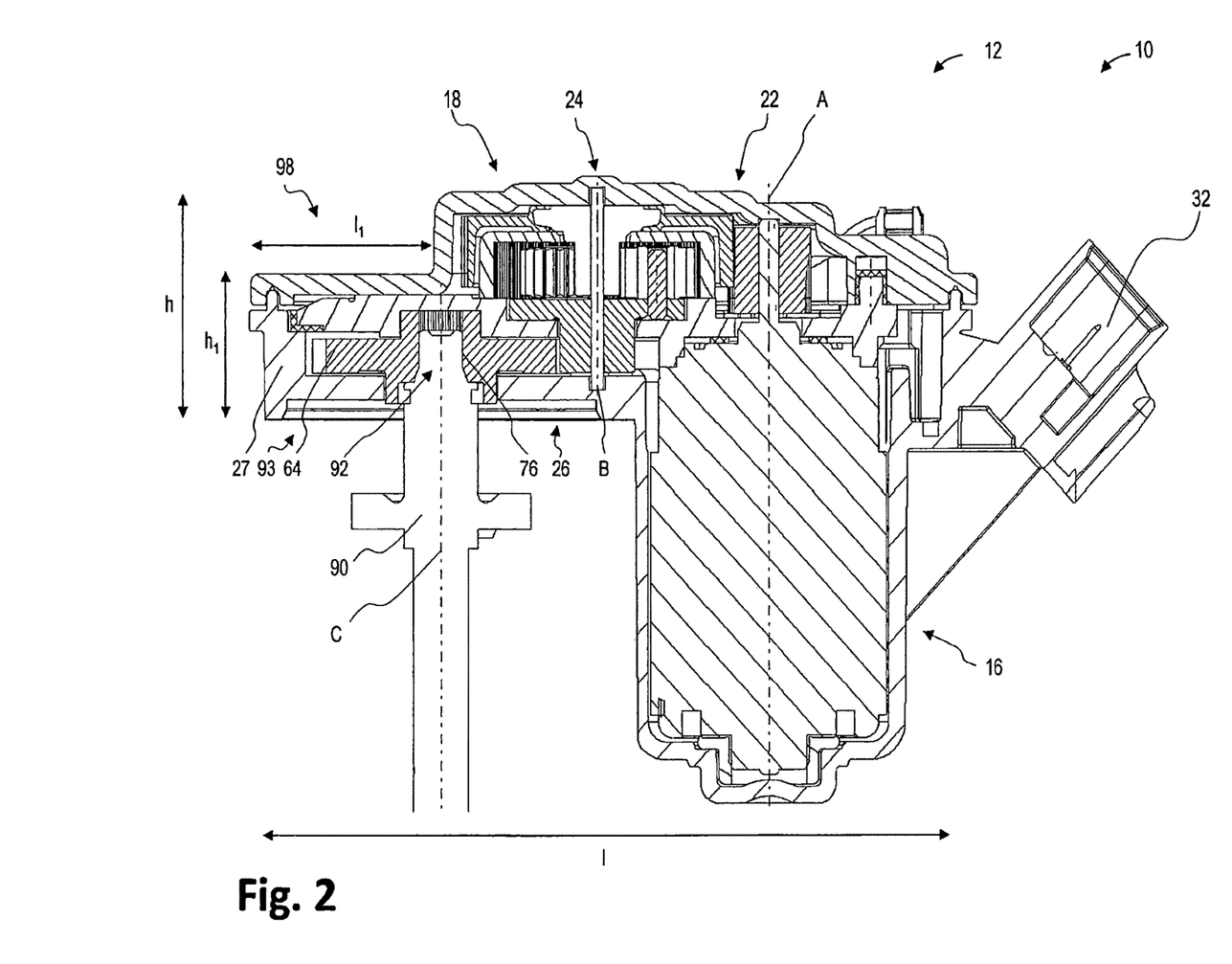
FIG. 2 is a sectional view of the electrical brake actuator from FIG. 1 with a drive element of a vehicle brake coupled with the brake actuator.

The drive element 90 forms a spindle element of a known nut/spindle arrangement for generating and holding braking forces in the vehicle brake, not shown. In known manner, brake activation can comprise generating braking forces and clamping forces for applying and releasing and for holding brake pads against a friction surface, such as a brake disk, for example.

In general, the gear mechanism 18 transmits a torque generated by the drive device 16 with multiple gear reduction by means of the gear stages 22, 24, and 26, to the drive element 90, which rotates about the third axis of rotation C of the gear mechanism 18 jointly with the output-side gear wheel 64 of the third gear stage 26. In known manner, a housing section of the vehicle brake, not shown, can furthermore be accommodated in an accommodation region 93 on the underside of the lower housing part 27.

Figure 3:
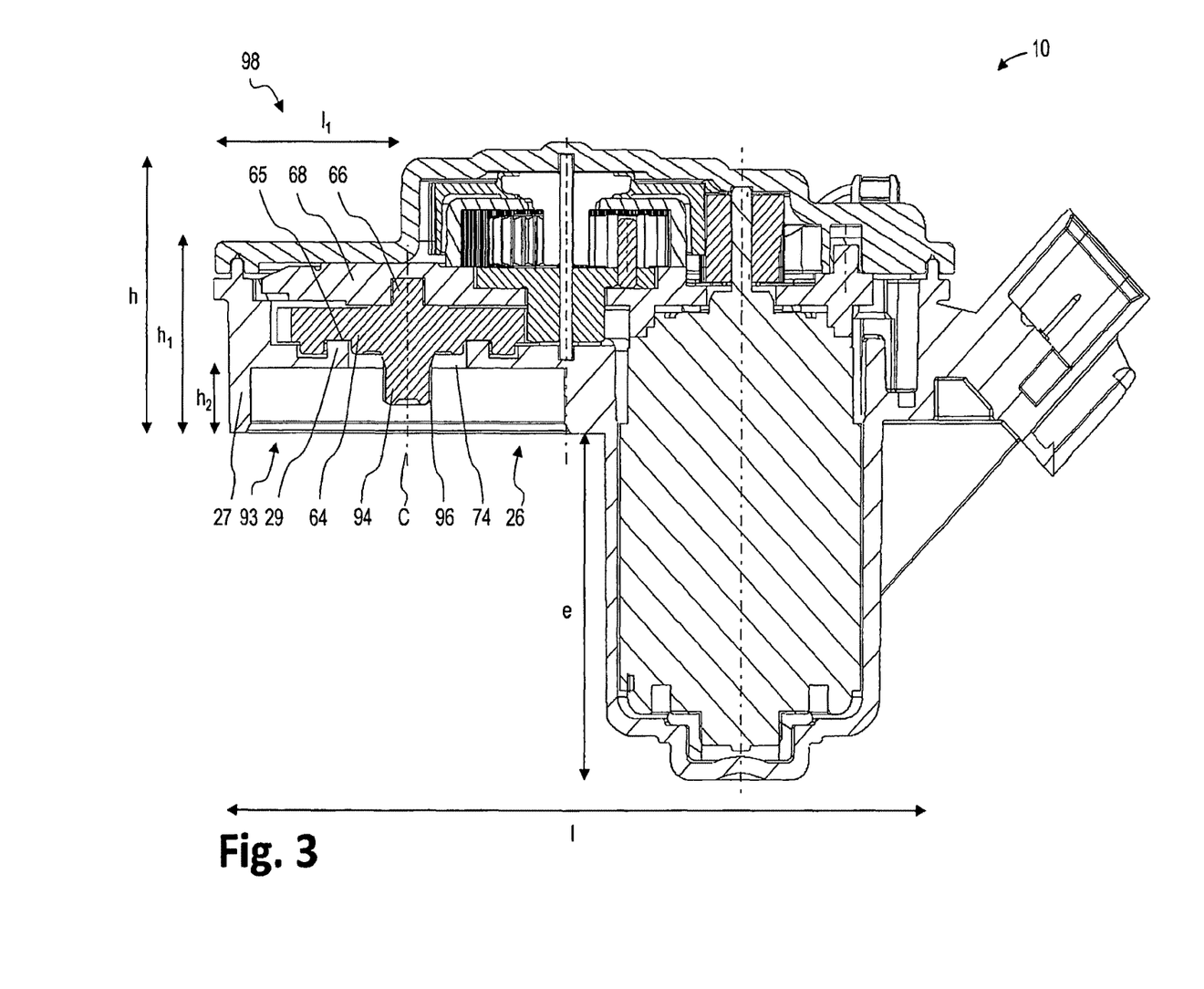
FIG. 3 is a sectional view of an electromechanical brake actuator comprising a subassembly according to a second exemplary embodiment.
Figure 4:
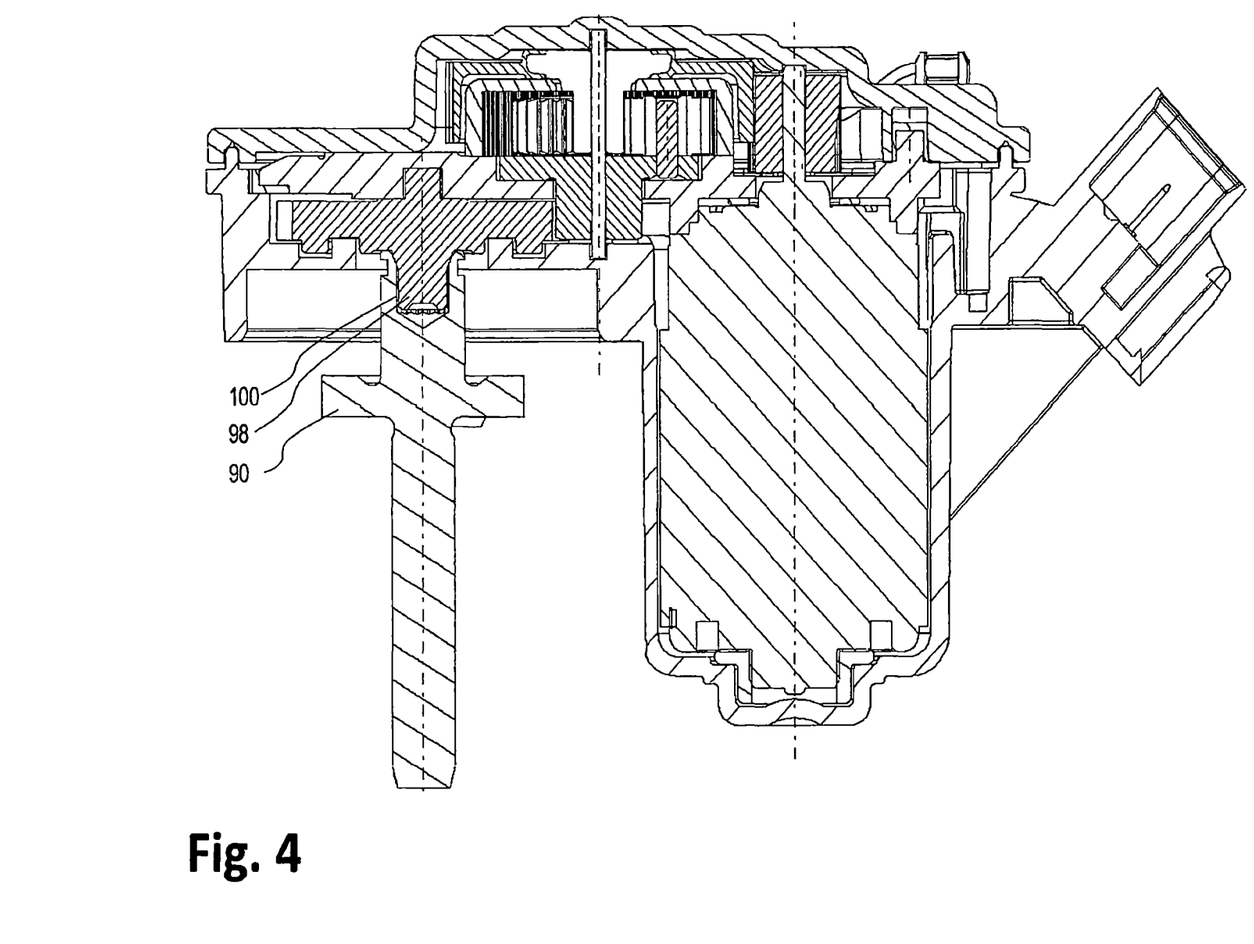
FIG. 4 is a sectional view of the electromechanical brake actuator from FIG. 3 with a drive element of a vehicle brake coupled with the electromechanical brake actuator.

A second exemplary embodiment of an electromechanical brake actuator 10 is shown in FIGS. 3 and 4. This actuator differs from the electromechanical brake actuator 10 according to FIGS. 1 and 2 only with regard to the configuration of the output-side gear wheel 64 of the third gear stage 26. A detailed description of the unchanged components as compared with the first exemplary embodiment will therefore not be provided.

According to the second exemplary embodiment, the output-side gear wheel 64 of the third gear stage 26 is configured for alternative coupling with the drive element 90 shown in FIG. 4, of a vehicle brake not shown in any detail. The method of functioning of the drive element 90 and the interaction with the vehicle brake, not shown, are identical with the drive element 90 shown in FIG. 2, in this regard.

In FIG. 3, it can be seen that the output-side gear wheel 64 of the third gear stage 26 is once again mounted in the support element 68 by way of a bearing section 70 and can be rotated about the third axis of rotation C. Furthermore, the gear wheel 64 is mounted on the lower housing part 27, in which it lies against a ring-shaped bearing projection 29 of the lower housing part 27. The latter engages into a correspondingly configured recess 65 on the underside of the gear wheel 64, facing the lower housing part 27.

The output-side gear wheel 64 of the third gear stage 26 is configured with a coupling section 94 disposed concentric to the axis of rotation C and configured in the manner of a projection, in this exemplary embodiment, which section projects outward through an opening 74 in the lower housing part 27. The coupling section 94 is configured with an outer profiling 96 in the form of a gear teeth profiling. As is evident from FIG. 4, the drive element 90 is configured, in this case, with a correspondingly configured cylindrical accommodation region 98, which accommodates the coupling section 94. In this regard, the drive element 90 stands in engagement with the outer profiling 96 of the gear wheel 64 by way of an inner profiling 100 of the accommodation region 98. Thereby the drive element 90 can be set onto (for example pushed onto) the coupling section 94 and is connected with it with torque fit.

In the following, returning to FIG. 2, the significant dimensions of the electromechanical brake actuator will be described. As was explained in the introduction, these dimensions are decisive, particularly with regard to the space requirement and the installation possibilities of the electromechanical brake actuator 10 in and on a vehicle.

A first significant dimension relates to the installation length l of the subassembly 12. This is essentially determined by the distance between the axes of rotation A, B, C of the gear mechanism 18 and the dimensions of the components that rotate about the axes of rotation A, B, C, in other words particularly by the individual gear wheels of the gear stages 22, 24, 26. A further contribution is made by the housing 14, which is configured close to the contour around the drive device and gear mechanism 16, 18. In contrast, the contribution of the plug connector 32 to the installation length l is not taken into consideration in the present case. From FIG. 2, it is evident that the installation length l therefore particularly relates to a horizontal expanse of the subassembly 12 or the dimensions of an axis that orthogonally intersects at least the first and third axis of rotation A, C.

Furthermore, the installation height h of the gear mechanism 18 is shown in FIG. 2. This installation height h relates to a maximal expanse of the gear mechanism 18 in the direction of the axes of rotation A, B, C, taking into consideration the housing regions that directly surround the gear mechanism 18. The installation height h therefore runs at a right angle to the installation length l, in other words vertically in FIG. 2.

In FIG. 2, it can be seen that the second gear stage 24, in particular, comprising the planetary gear set, makes a great contribution to the installation height h. In contrast, the output-side end of the gear mechanism 18, comprising the output-side gear wheel 64 of the third gear stage 26, is characterized by a comparatively low installation height $h_1$. Because of the placement of the planetary gear set as the second gear stage, close to the drive device 16, the subassembly 12 thereby has a comparatively low installation height $h_1$, in total, close to its output-side end. However, because the planetary gear set is accommodated in a free cylindrical space 41 of the output-side gear wheel 36 of the first gear stage 22, the maximal installation height h of the gear mechanism 18 also comes out to be comparatively slight.

Furthermore, in the case shown, a step-shaped free region 98 occurs on the top side of the output-side gear wheel 64, which region has a partial installation length $l_1$. The slight installation height $h_1$ as well as the volume of the step-shaped free space 98 restrict the dimensions of the subassembly 12 in the region of the output-side end and thereby increase the available space for an overlapping arrangement with adjacent vehicle components.

The second embodiment according to FIGS. 3 and 4, as well, is characterized by a compact installation length l and a reduced installation height h. On the output-side end of the gear mechanism 18, there is a reduced installation height $h_1$, once again, along with a step-shaped free space 98 that extends over a partial installation length $l_1$. Thus, the same advantages occur with regard to installation of the subassembly 12 as in the preceding embodiment according to FIGS. 1 and 2. In comparison with the preceding embodiment, the reduced installation height $h_1$ comes out to be somewhat greater, because the output-side gear wheel 64 of the third gear stage 26 is configured with a coupling section 94 that projects out of the housing 14. In the case shown, however, this does not have a disadvantageous effect on installation of the subassembly 12 in or on a vehicle, depending on the installation situation.

FIG. 3 clearly shows that the accommodation region 93 of the lower housing part 27 is configured with an increased depth $h_1$ to accommodate a housing of the vehicle brake, not shown. The vehicle brake and, in particular, its housing can thereby be pushed into the lower housing part 27 of the subassembly 12 by a greater dimension, in order to overlap with it.

Furthermore, the drive device 16 (to state it more precisely, its cylindrical housing section) projects by a lesser dimension, with reference to the face side of the lower housing part 27 that faces the brake housing, in comparison with the preceding exemplary embodiment. This is marked in FIG. 3 as a reduced protrusion e along the axis of rotation A of the drive device 16. The reduced protrusion e can bring advantages with it (for example depending on the dimensioning of the brake housing, particularly the expanse parallel to the axis A). Thus, it can be guaranteed in this way, for example, that the bottom of the cylindrical housing section of the drive device 16 is spaced apart sufficiently from a brake disk or from an adjacent component of the vehicle.

Figure 5:
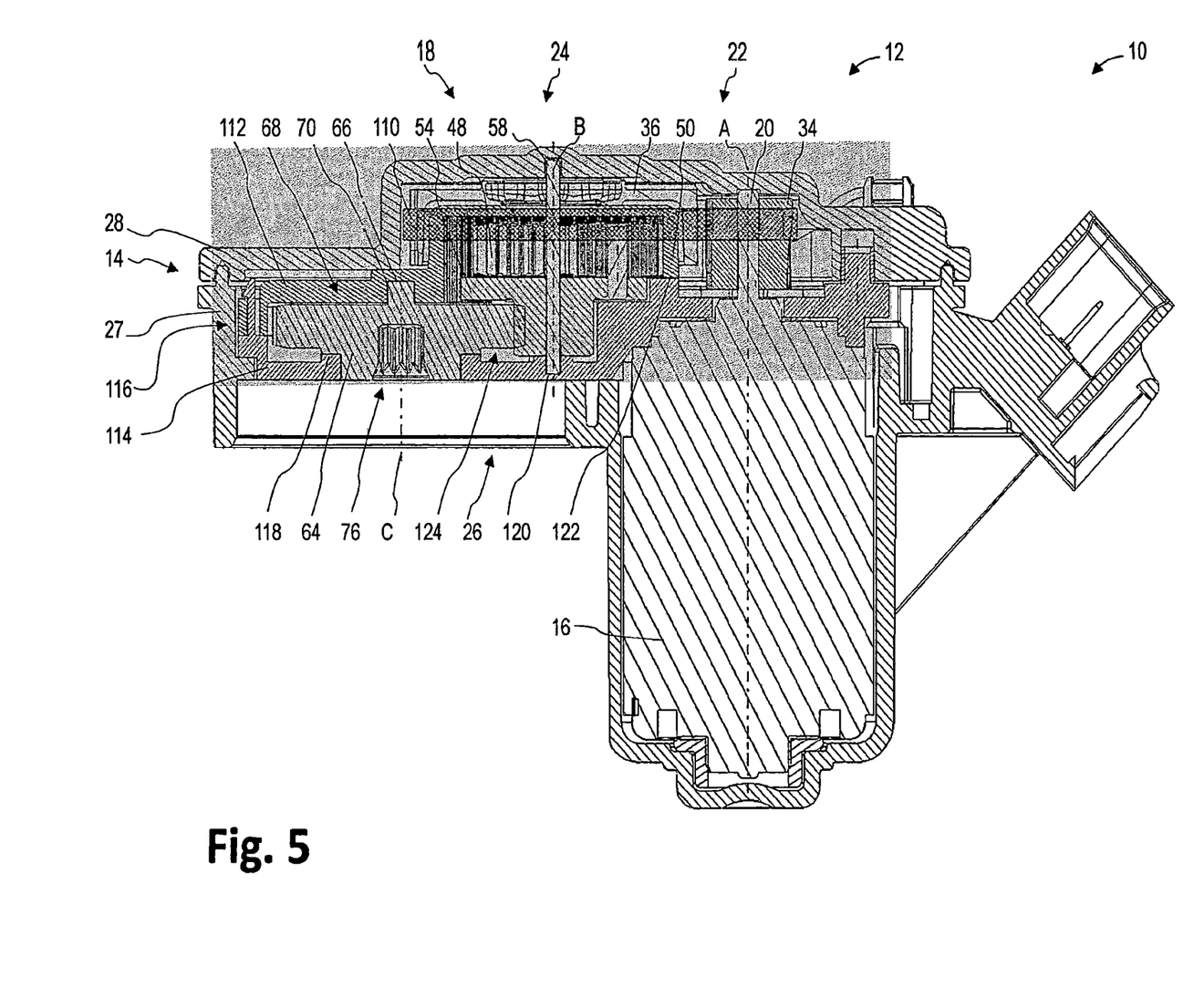
FIG. 5 is a sectional view of an electromechanical brake actuator comprising a subassembly according to a third exemplary embodiment.

In FIG. 5, a third exemplary embodiment of an electromechanical brake actuator 10 is shown. This embodiment differs from the exemplary embodiments discussed above with regard to the configuration of the first gear stage 22 and of the support element 68. A detailed description of the components that are unchanged as compared with the first and second exemplary embodiment will therefore be left out.

In the third exemplary embodiment according to FIG. 5, the first gear stage 22 is configured as a belt gear mechanism. For this purpose, the drive-side gear wheel 34 of the gear stage 22 is configured as a toothed belt gear wheel and stands in torque-fit engagement with a toothed belt 110. The toothed belt 110 runs around the output-side gear wheel 36 of the first gear stage 22, which is also configured as a toothed belt gear wheel and stands in engagement with the toothed belt 110. In contrast to the first and second exemplary embodiment, the drive-side gear wheel 34 and the output-side gear wheel 36 of the first gear stage 22 therefore do not mesh with one another, but rather rotate at a distance from one another and are coupled by means of the toothed belt 110 for transmitting torques. Configuration of the first gear stage 22 as a belt gear mechanism contributes to noise reduction during operation of the brake actuator 10. As an option, the third gear stage could also be configured as a belt gear mechanism (not shown).

A further particularity of the third exemplary embodiment relates to the design of the support element 68. This element is configured in two parts in the case shown and comprises an upper component part 112 and a lower component part 114, which are attached to one another by means of a lock-in connection 116 or in some other way. The lower component part 114 is disposed within the subassembly 12, comparable to the support element 68 of the first and second exemplary embodiment. Accordingly, it extends from the drive-side end to the output-side end of the gear mechanism 18 and in doing so intersects all the axes of rotation A, B, C of the gear mechanism 18.

The lower component part 114 of the support element 68 accommodates and supports individual components of the gear mechanism 18. Analogous to the lower housing part 27 of the second exemplary embodiment, the lower component part 114 is configured, in this regard, with a ring-shaped bearing projection 118 bearing the output-side gear wheel 64 of the third gear stage 26. For this purpose, the ring-shaped bearing projection 118 lies against the side of the output-side gear wheel 64 that faces the lower housing part 27. Furthermore, the lower component part 114 accommodates and supports the gear set axle 58 of the planetary gear set in an accommodation recess 120. Likewise, the lower component part 114 lies against the ring gear 50 of the planetary gear set in a contact region 122.

The upper component part 112 is configured in one piece with the ring gear 50 of the second gear stage 24. Furthermore, it extends between the upper housing part 28 and the output-side gear wheel 64 of the third gear stage 26. In this regard, the upper component part 112 accommodates and supports the output-side gear wheel 64, analogous to the exemplary embodiment described above. For this purpose, the bearing recess 66 in the upper component part 112 and a bearing section 70 of the gear wheel 64 interact in the manner described above.

Furthermore, it can be seen that the upper and lower component parts 112, 114 of the support element 68 enclose an accommodation space 124 in cage-like manner. The second gear stage 24 is accommodated in this space, at least in part, particularly in the form of the planet wheels 48 and the planet wheel support 56. The third gear stage 26 is accommodated in the accommodation space 124 almost completely, with the exception of the accommodation space 76 of the output-side gear wheel 64, which space is accessible from the outside. As described above, the output-side gear wheel 64 of the third gear stage 26 is mounted on both sides, within the component parts 112, 114 of the support element 68, so as to be rotatable. Bearing recesses are provided for this purpose. The third axis of rotation C of the gear mechanism 18 is accordingly established by the support element 68.

In total, with the exception of the end of the gear set axle 58 that is at the top in FIG. 5, no components of the gear mechanism 18 lie directly against the housing 14 of the subassembly 12.

The gear mechanism 18 is combined into an assembly that can be handled independently by means of the two-part configuration of the support element 18, particularly with regard to the second and third gear stages 24, 26. This simplifies installation. Furthermore, a mechanically robust design results from placing the numerous gear mechanism components within the accommodation region 124 and mounting them in or between the upper and lower component parts 112, 114. Thus, reaction forces and/or bearing forces that occur particularly at the second or third axis of rotation B, C or at the gear set axle 58 can be directly absorbed by the support element 68. Likewise, advantages of production technology occur, because components accommodated in the accommodation region 124 of the support element 68 are uncoupled from possible production tolerances of the housing 14. This particularly relates to the output-side gear wheel 64 of the third gear stage 26, which is completely mounted in the support element 68, and to its axis of rotation C. Finally, the noise emissions of the gear mechanism 18 can also be restricted by placement within the accommodation space 124.

Figure 6:
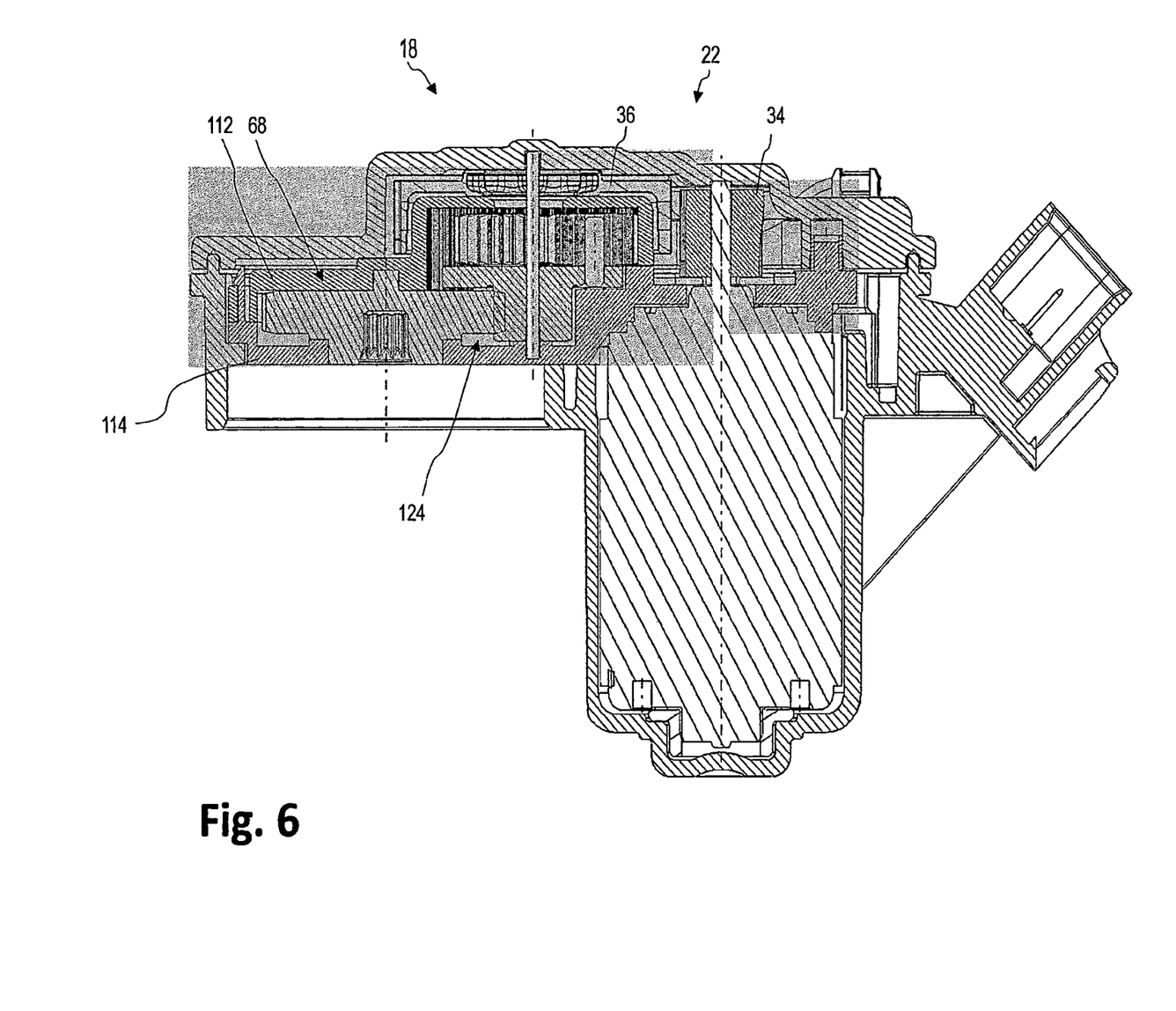
FIG. 6 is a sectional view according to FIG. 5, leaving out a toothed belt of the first gear stage.

In FIG. 6, the third exemplary embodiment according to FIG. 5 is shown, leaving out the toothed belt 110 of the first gear stage 22. This representation once more clarifies the particular embodiment of the support element described above using FIG. 5, with an upper and lower component part 112, 114, which parts define an accommodation space 124 that partially encloses the gear mechanism 18.

In total, it is understood that the variants according to the exemplary embodiments discussed above can also be combined or interchanged with regard to individual characteristics. Thus, for example, a configuration of the output-side gear wheel 64 with a coupling section 94 according to the second exemplary embodiment can also be provided in the third exemplary embodiment according to FIG. 5. Likewise, in the first or second exemplary embodiment, the first and/or the third gear stage 22, 26 can be configured as a belt gear mechanism and/or the support element can be configured analogous to the third exemplary embodiment.

In general, the gear mechanism presented here can make a gear reduction ratio available that lies between 400:1 and 50:1. The gear reduction ratio particularly lies between 300:1 and 100:1, for example at approximately 200:1.

According to the exemplary embodiments, the gear mechanism 24 that comprises the planetary gear set does not form an output-side gear stage 22, 26, but rather is disposed between the drive-side first gear stage 22 and the output-side third gear stage 26. This allows a design of the subassembly 12 optimized for the construction space, thereby increasing the flexibility with regard to installation in a vehicle. Thus, many implementations of the teaching presented here permit placement of the comparatively bulky planetary gear set closer to (for example overlapping with) the drive device 16, which also has a relatively large construction. Thus, these comparatively large components can be concentrated adjacent to one another in the subassembly 16. In contrast, the region of the third gear stage that is remote from the drive device 16 can be configured to be comparatively compact. In this way, the construction size of the subassembly 12 can be reduced, particularly in this region, and this facilitates installation in certain installation situations (for example under cramped conditions).

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A subassembly for an electromechanical brake actuator, comprising:
    a drive device for generating a torque; and
    a gear mechanism for transmitting the torque, wherein the gear mechanism has a first, a second, and a third gear stage, one behind the other, wherein the second gear stage comprises a planetary gear set, and wherein the third gear stage is configured as a spur-gear gear mechanism;
    wherein the first gear stage comprises an output-side gear wheel, wherein the output-side gear wheel is accommodated at least partially in a cylindrical space in which the planetary gear set is accommodated, at least in part, such that the planetary gear set is disposed to overlap with the output-side gear wheel and be partly pushed into the output-side gear wheel in order to reduce an installation height of the gear mechanism.

2. The subassembly according to claim 1, wherein the first and/or the third gear stage are/is configured as gear wheel gear mechanism(s).

3. The subassembly according to claim 1, wherein the first gear stage is configured as a spur-gear gear mechanism.

4. The subassembly according to claim 1, wherein the first gear stage comprises an output-side gear wheel, wherein the output-side gear wheel is coupled with a sun wheel of the planetary gear set in torque-proof manner.

5. The subassembly according to claim 1, wherein the planetary gear set comprises a gear set axle that bears an output-side gear wheel of the first gear stage and/or a drive-side gear wheel of the third gear stage.

6. The subassembly according to claim 1, wherein the planetary gear set comprises a gear set axle that extends between two opposite regions of a housing of the subassembly and is mounted in the housing with at least one free end.

7. The subassembly according to claim 1, wherein the planetary gear set is configured with a fixed ring gear.

8. The subassembly according to claim 1, wherein a planet wheel support of the planetary gear set is coupled with planet wheels in a torque-transmitting manner and is coupled with a drive-side gear wheel of the third gear stage in a torque-proof manner.

9. The subassembly according to claim 1, wherein an output-side gear wheel of the third gear stage is configured for coupling with a drive element of a vehicle brake.

10. The subassembly according to claim 9, wherein the output-side gear wheel of the third gear stage is configured with an accommodation region for accommodating a coupling section of the drive element.

11. The subassembly according to claim 10, wherein the accommodation region is configured with an inner profiling.

12. The subassembly according to claim 9, wherein the output-side gear wheel of the third gear stage is configured with a coupling region for accommodation in an accommodation region of the drive element.

13. The subassembly according to claim 12, wherein the coupling region is configured with an outer profiling.

14. The subassembly according to claim 1, wherein the subassembly furthermore comprises a support element for mounting components of the gear mechanism and/or of the drive device.

15. The subassembly according to claim 14, wherein a gear wheel of the first and/or of the third gear stage is mounted in the support element so as to be rotatable.

16. The subassembly according to claim 14, wherein a ring gear of the planetary gear set is configured in one piece with the support element.

17. The subassembly according to claim 14, wherein an axis of rotation of an output-side gear wheel of the third gear stage is established by the support element.

18. An electromechanical brake actuator comprising a subassembly according to claim 1.

* * * * *